United States Patent [19]
Fontaine et al.

[11] 3,845,773
[45] Nov. 5, 1974

[54] CARDIAC STIMULATORS

[75] Inventors: Guy Hugues Fontaine; Alain Ribot, both of Paris, France

[73] Assignee: Association de Recherche et D'Entraide Cardiologiques et Angeiologiques, Paris, France

[22] Filed: July 7, 1972

[21] Appl. No.: 269,724

[52] U.S. Cl. .......... 128/419 P
[51] Int. Cl. .......... A61n 1/36
[58] Field of Search .......... 128/419 C, 419 E, 419 P, 128/419 R, 421, 422

[56] References Cited
UNITED STATES PATENTS

| | | | |
|---|---|---|---|
| 3,311,111 | 3/1967 | Bowers | 128/419 P |
| 3,518,997 | 7/1970 | Sessions | 128/419 P |
| 3,563,247 | 2/1971 | Bowers | 128/419 P |
| 3,593,718 | 7/1971 | Krasner et al. | 128/419 P |
| 3,620,220 | 11/1971 | Murphy, Jr. | 128/419 P |
| 3,659,616 | 5/1972 | Bukowiecki et al. | 128/419 P |

*Primary Examiner*—William E. Kamm
*Attorney, Agent, or Firm*—Woodward, Weinkart, Emhardt & Naughton

[57] ABSTRACT

Cardiac stimulator comprising a conductor system in contact with the muscle to be stimulated, connected to a source of electrical impulses, in which said source comprises means of producing a first impulse signal of a frequency half of that of the cardiac rate to be stimulated, and a second impulse signal of the same frequency as the first but out of phase with it by half a period. In one embodiment, separate sources of electrical energy are connected to two signal generators. A delay line between the generators insures that the signal present on one generator output line is out of phase with the signal present on the other generator output line. In one version, the output lines are connected to a single electrode whereas in another version, the output lines are connected to separate electrodes. In another embodiment, a single source of electrical energy is connected to a generator having an output signal which is interrupted and directed first to one electrode and then to a second electrode.

3 Claims, 4 Drawing Figures

CARDIAC STIMULATORS

The present invention relates to a cardiac stimulator.

Cardiac stimulators are already known which consist of a source of electrical energy such as a mercury cell, and isotopic, biogalvanic or other source, and an electronic circuit producing impulses which are brought to the muscle to be stimulated by means of one or two electrodes implanted on or in the heart and of one or two conducting wires connecting the electronic circuit to these electrodes.

However, these known devices have considerable disadvantages resulting in particular from the fact that no means are provided for countering a mechanical rupture of a wire, the probability of such a rupture increasing with the length of time the apparatus has been implanted, and this can result in the death of a patient.

Likewise, these same disadvantages can occur for various other reasons, for example, beacuse of the displacement of at least one of the electrodes of the exhaustion of the source of electrical energy.

The object of the present invention is in particular to overcome these disadvantages and to that end it relates to a cardiac stimulator comprising a conductor system in contact with the muscle to be stimulated, connected to a source of electrical impulses, characterized in that said source comprises means of producing a first impulse signal of a frequency half of that of the cardiac rate to be stimulated and a second impulse signal of the same frequency as the first, but out of phase with it by half a period.

The object of the present invention is therefore to provide a cardiac stimulator in which any breakdown of the generator of impulses manifests itself solely by the reduction of the normal cardiac rate by one half, in order to draw attention to the faulty functioning of the generator, without endangering the life of the patient.

The object of the invention is also to provide a cardiac stimulator which enables a number of possible breakdowns to be countered, by causing, if these occur, a signal to be generated which is easily perceived by the subject himself without interrupting stimulation.

In general, the object of this stimulator is to increase the safety of the electrical activation of the patient's heart.

The stimulator according to the invention is illustrated by way of non-limitative example on the accompanying drawings in which:

FIG. 1 shows a stimulator according to the invention which, in this case, is constructed as a monopolar stimulator and is connected, by means of the conductor 1, to an electrode 2 applied on or in the cardiac muscle to be stimulated.

Figure 1:
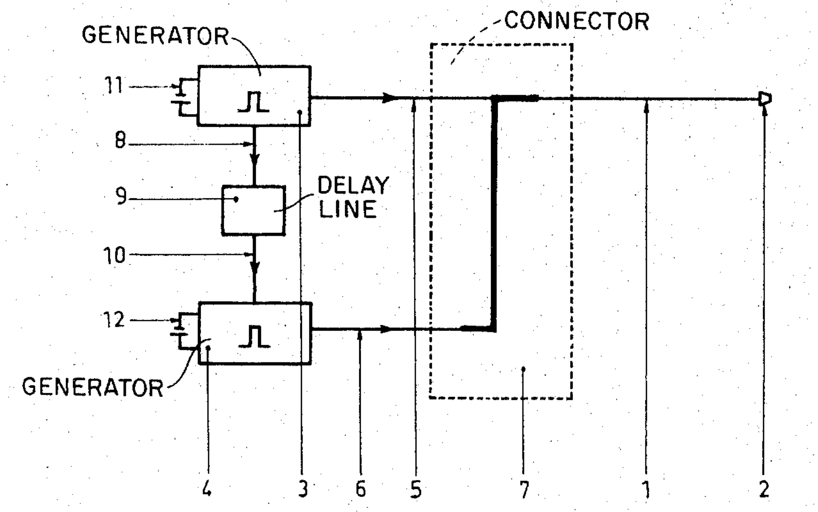
FIG. 1 represents a block diagram of a monopolar cardiac stimulator.

This impulse generator combines, according to the invention, two generating units 3 and 4 consisting of multivibrators, the output terminals of these generators being connected by means of the conductors 5 and 6 to an intermediate connector 7, from which emerge, on the same conductor 1, the stimulation impulses.

The multivibrator 3 constitutes the master operator and is connected by the conductor 8 to a delay line 9 itself controlling, by means of the conductor 10, the multivibrator 4 constituting the second generator.

Each of the generators 3 and 4 possesses an independent source of power, respectively 11 and 12, and operates at a frequency equal to half of the normal cardiac stimulation rate. However, in this construction, the impulses produced by the generator 4 are initiated from the generator 3, by means of the delay line 9 so that the difference in phase corresponds to a half period of the cardiac stimulation rate.

It will be noted consequently that, according to this construction, the cardiac stimulation is divided into two only when one of the generators breaks down, so that the patient is warned of the faulty functioning of the stimulator without this faulty functioning being fatal to him.

Figure 2:
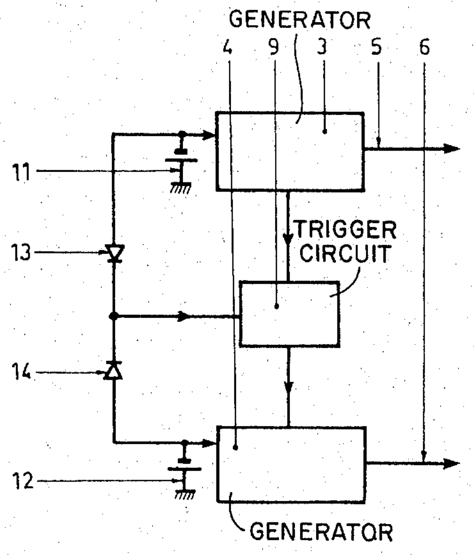
FIG. 2 represents a block diagram of another mode of constructing the stimulator.

In the example of construction in FIG. 2, a stimulator is shown of which the output conductors 5 and 6 are connected, for example, to two electrodes. In this case also the stimulator comprises two generators 3 and 4 consisting of multivibrators, the multivibrator 3 controlling the multivibrator 4 by means of the delay line consisting of a trigger-circuit.

In this construction the cells 11 and 12 supplying electrical energy are connected to the trigger-circuit 9 by means of diodes, respectively 13 and 14, supplying power to the trigger-circuit 9 even when one of the cells 11 or 12 has failed.

It will be noted, in addition, that in the case when the device comprises only one electrode it is possible to detect a decrease in available power from the sources of energy by giving the impulses produced by the two generators, either different amplitudes, durations or forms so that if the least efficient impulses reach an energy level below that of the excitability threshold, the cardiac muscle can nevertheless be stimulated at half frequency by the other impulses, the patient thus being warned of the exhaustion of one of the sources of energy or the abnormal increase of the excitability threshold.

Figure 3:
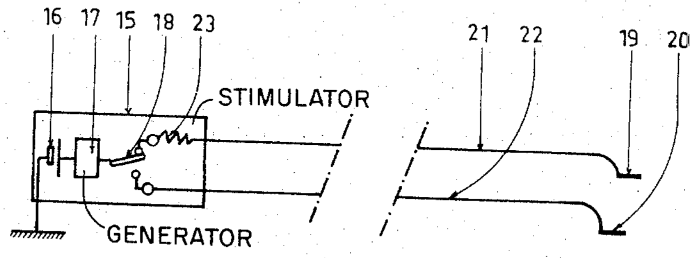
FIG. 3 represents schematically a system according to the invention.

The stimulator, represented schematically in FIG. 3, consists of an assembly 15 comprising schematically a source of electrical energy 16 and a circuit 17 producing electrical impulses. In addition, this assembly comprises, according to the invention, a means 18 enabling the impulses produced by the circuit 17 to be brought to each of the electrodes 19 and 20, connected respectively to the means 18 by the conductors 21 and 22.

The electronic circuit 17 produces electrical impulses whose duration is of the order of one to two milliseconds, whose amplitude is 3 to 10 volts, and whose frequency is 40 to 120 beats per minute according to the stimulation rate required.

Likewise, the means 18 which alternatively send impulses to one or other of the electrodes 19 and 20 implanted on or in the heart consists of any means, for example an electronic trigger-circuit with transistors.

The circuit of these impulses sent alternatively to the electrodes 19 and 20 is closed by an earthed circuit consisting for example of a metal case of the assembly 15 or of an electrode called "neutral" imbedded in the tissue.

With this device it is found that if one of the two wires 21 or 22 breaks or if one of the two electrodes displaces itself thereby increasing the stimulation threshold, there still remains an electrode which brings stimulation impulses to the muscle at a rate half of the normal rate which enables life to be maintained. The patient is then warned of the faulty functioning of the apparatus, either by taking his pulse, or by feeling a difference in the stimulation rate or else after medical examination.

According to the invention there is also provided in the circuit of one of the electrodes a means of determining the nature of the difference of the impulses brought to the two electrodes. This means for example, in the case of a difference in amplitude can consist of an electrical resistor 23 placed in series with the electrode 19 and the conductor 21 so that the impulse 24 (see FIG. 4) produced by the electrode 19 is of a smaller amplitude when the impulse 25 produced alternatively by the electrode 20, these two impulses being nevertheless of an amplitude greater than that of the excitability threshold 26 of the cardiac muscle to be stimulated.

The heart is thus activated by the cardiac stimulus according to the stimulation impulses rate, if these impulses have an amplitude greater than that of the excitability threshold.

Thus, if any of the electrodes displaces itself or if the stability of the electrode-myocardium deteriorates, the amplitude of the stimulation impulse brought by this electrode becomes smaller than the excitability threshold, which corresponds, as already indicated to a decrease of the cardiac rate by half.

Figure 4:
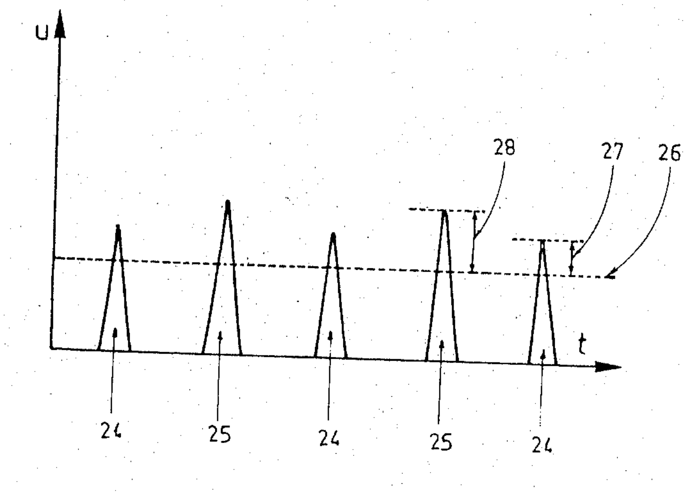
FIG. 4 is a diagram representing a type of impulses utilized according to the invention.

In the example illustrated in FIG. 4, the differences 27 and 28 between the excitability threshold 26 and the amplitude of the impulses 24 and 25 produced by the stimulator, defines a safety margin. In this example it has been assumed that the excitability threshold is the same for the two electrodes, but in reality this is rarely the case.

The amplitude of the impulses 24 and 25 being different, the safety margins 27 and 28 of the stimulation are themselves different.

If for any reason due, for example, to a decrease in the available power from the battery, the amplitude of the impulses 24 and 25 diminishes, the stimulation rate becomes equal to half the normal cardiac rate as soon as the weakest impulse 24 falls below the excitability threshold 26.

With this device there will thus be stimulation of the cardiac muscle once every two times while the amplitude of the two impulses of the stimulator gradually decreases as the source of power runs down and the amplitude of these impulses lies on both sides of the excitability threshold 26.

As in the preceeding case the patient is therefore warned of the abnormal functioning of the stimulator and can immediately take the appropriate measures to remedy the situation.

Instead of using stimulation impulses of different amplitudes it is also possible in certain cases to make use of the difference between the excitability thresholds correspoonding to each of the electrodes. Thus, in that case, the impulses can have identical amplitudes, the alarm being automatically given to the patient as soon as the amplitude of the impulses falls below the highest excitability threshold of the two electrodes.

It is obvious that the invention is not limited to the example of its application herein above described and illustrated and that on the basis of it other modes and other forms of application can be envisaged without departing from the scope of the invention.

What is claimed is:

1. A cardiac stimulator for a muscle comprising:
a single source of electrical energy;
a single generator connected to said source operable to produce electrical impulses of a frequency equal to the cardiac rate to be stimulated;
a pair of electrodes adapted to be in contact with the muscle to be stimulated;
switching means connected to said electrodes and to said single generator operable to send said impulses alternatively to each of said electrodes;
and,
resistive means connected between said switching means and one electrode of said pair of electrodes to reduce amplitude of an impulse on said one electrode while not changing said frequency.

2. A cardiac stimulator for a muscle comprising:
a first source of electrical energy;
a second source of electrical energy independent of said first source;
a first impulse generator connected to said first source, said generator having a first impulse signal of a frequency half of that of the cardiac rate to be stimulated;
a second impulse generator connected to said second source, said second generator having a second impulse signal equal in frequency to said first impulse signal;
delay means connected to and between said first impulse generator and said second impulse generator and operable to cause said second impulse signal to be out of phase with said first impulse signal by half a period of said cardiac rate;
a pair of conductors connected to said first impulse generator and said second impulse generator to receive said first impulse signal and said second impulse signal; and,
an electrode connected to said conductors and adapted to be in contact with the muscle to be stimulated.

3. A cardiac stimulator for a muscle comprising:
a first source of electrical energy;
a second source of electrical energy independent of said first source;
a first impulse generator connected to said first source, said generator having a first impulse signal of a frequency half of that of the cardiac rate to be stimulated;
a second impulse generator connected to said second source, said second generator having a second impulse signal equal in frequency to said first impulse signal;
a trigger means connected to and between said first impulse generator and said second impulse generator being operable to cause said second impulse signal to be out of phase with said first impulse signal by half a period of said cardiac rate;
a pair of electrodes adapted to be in contact with the muscle to be stimulated with said electrodes connected to said first impulse generator and said second impulse generator to receive said first impulse signal and said second impulse signal.

* * * * *

UNITED STATES PATENT OFFICE

CERTIFICATE OF CORRECTION

Patent No. 3,845,773 Dated November 5, 1974

Inventor(s) Guy Hugues Fontaine; Alain Ribot

It is certified that error appears in the above-identified patent and that said Letters Patent are hereby corrected as shown below:

After line [21] "Appl. No.: 269,724" please add the following:

Foreign Application Priority Data

July 9, 1971 France. . . . . . . . . 71 25 272

Signed and sealed this 22nd day of April 1975.

(SEAL)
Attest:

RUTH C. MASON
Attesting Officer

C. MARSHALL DANN
Commissioner of Patents
and Trademarks